(12) United States Patent
Shatara

(10) Patent No.: US 7,697,913 B2
(45) Date of Patent: Apr. 13, 2010

(54) DUAL TUNER DIVERSITY FOR BACKGROUND PROCESSING AND TO REDUCE MULTIPATH DISTORTION

(75) Inventor: Raed S. Shatara, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 604 days.

(21) Appl. No.: 11/311,884

(22) Filed: Dec. 19, 2005

(65) Prior Publication Data

US 2007/0142011 A1   Jun. 21, 2007

(51) Int. Cl.
H04B 1/10 (2006.01)
H04B 1/06 (2006.01)
H04B 7/00 (2006.01)

(52) U.S. Cl. ............ 455/296; 455/222; 455/278.1

(58) Field of Classification Search ......... 455/160.1, 455/178.1, 183.2, 185.1, 191.1, 222, 272, 455/278.1, 296, 297
See application file for complete search history.

(56) References Cited

U.S. PATENT DOCUMENTS

| | | | | |
|---|---|---|---|---|
| 4,926,498 A * | 5/1990 | Suzuki et al. | ............... | 455/133 |
| 6,064,865 A * | 5/2000 | Kuo et al. | ............... | 455/135 |
| 6,091,458 A * | 7/2000 | Jeon et al. | ............... | 348/554 |
| 6,236,844 B1 * | 5/2001 | Cvetkovic et al. | ........... | 455/273 |
| 6,289,062 B1 * | 9/2001 | Wang et al. | .............. | 375/346 |
| 6,542,203 B1 * | 4/2003 | Shadwell et al. | ............ | 348/726 |
| 6,985,188 B1 * | 1/2006 | Hurst, Jr. | .................... | 348/553 |
| 7,058,376 B2 * | 6/2006 | Logan et al. | ............. | 455/186.1 |
| 7,286,808 B2 * | 10/2007 | Sugiyama et al. | ........... | 455/275 |
| 7,376,336 B2 * | 5/2008 | Nakamura | .................. | 386/92 |
| 2002/0168955 A1 * | 11/2002 | Wildhagen | ............... | 455/277.1 |
| 2003/0125003 A1 * | 7/2003 | Whikehart et al. | ....... | 455/277.2 |
| 2004/0137866 A1 * | 7/2004 | Miyamura | ............... | 455/185.1 |
| 2005/0191979 A1 * | 9/2005 | Spellman | .................. | 455/178.1 |
| 2005/0245298 A1 * | 11/2005 | Mori | ........................ | 455/575.7 |
| 2006/0166634 A1 * | 7/2006 | Ido | .......................... | 455/277.1 |
| 2006/0194562 A1 * | 8/2006 | Marrah et al. | ............... | 455/334 |
| 2007/0036249 A1 * | 2/2007 | Shatara et al. | .............. | 375/347 |

OTHER PUBLICATIONS

EP Search Report dated Mar. 23, 2007.

* cited by examiner

*Primary Examiner*—Nay A Maung
*Assistant Examiner*—Andrew Wendell
(74) *Attorney, Agent, or Firm*—Jimmy L. Funke

(57) ABSTRACT

A receiver system with dual tuner diversity for background processing and for reducing multipath distortion. The receiver system provides a plurality of antennas with a dual tuner design. One tuner may be used solely for background processing of a received signal while the other tuner may be simultaneously used to reduce multipath distortion.

22 Claims, 2 Drawing Sheets

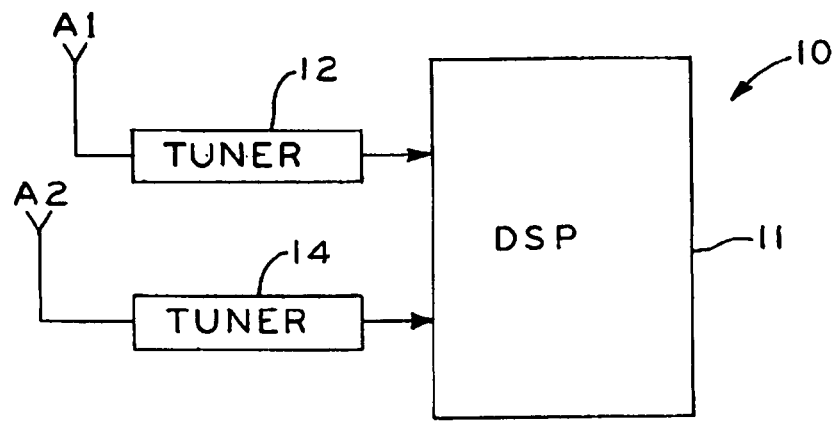
FIG_1
PRIOR ART
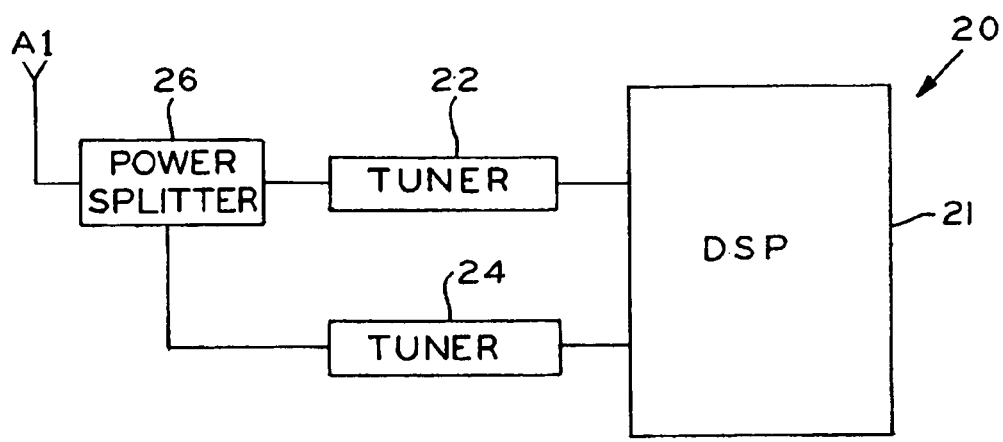
FIG_2
PRIOR ART

DUAL TUNER DIVERSITY FOR BACKGROUND PROCESSING AND TO REDUCE MULTIPATH DISTORTION

TECHNICAL BACKGROUND

The present invention relates generally to dual tuner diversity, and, more particularly, to dual tuner diversity for background processing and for reducing multipath distortion.

BACKGROUND OF THE INVENTION

As is well known, multipath interference is caused when two or more signal rays of an original transmitted signal converge upon a receiving antenna of a receiver at significantly different times. This misalignment or superposition of several delayed signals, which are replicas of the original signal, may cause distortion in audio recovered from the signals. Distortion caused by the multipath interference may be attributable to long delay (e.g., greater than five microseconds between signals) multipath interference or short delay (e.g., less than five microseconds between signals) multipath interference.

In a typical urban environment, RF signals experience changes in amplitude and phase due to short delay multipath. This amplitude and phase shift may result in broadband signal fades of up to 40 dB, as the receiver and its associated motor vehicle change locations. At typical highway speeds, signal fluctuation rates in the range of 100 to 1 kHz may occur. In general, long delay multipath (or frequency selective multipath) is found in areas where reflectors are greater than four to five miles away. Typically, long delay multipath occurs in cities with large buildings and in mountainous regions.

Typically, long and short delay multipath coexists and creates frequency selectivity and broadband fading, simultaneously. For example, an FM demodulated signal may contain a 1 kHz tone with a 75 kHz deviation. In such a situation, a reflected signal may have an amplitude of, for example, 0.9 units while a direct signal has, for example, an amplitude of 1 units. In the case where the time delay of the reflected signal is about 30 microseconds, the distortion attributable to the time delay may be on the order of approximately twelve percent.

In various receiver systems, antenna diversity has been implemented in conjunction with an FM receiver to reduce degraded reception performance caused by multipath interference. Antenna diversity has been accomplished through the use of two or more uncorrelated antennas. Prior art antenna diversity reception for mobile communication systems has been achieved by a number of different implementations. For example, antenna diversity has been accomplished with equal gain combiner (EGC) systems, maximal ratio combiner (MRC) systems and antenna diversity systems, such as the adaptive reception system (ARS) disclosed in U.S. Pat. No. 5,517,686, the disclosure of which is hereby incorporated herein by reference in its entirety.

EGC and MRC systems utilize signals from all antennas through a variety of combining techniques that attempt to optimize certain characteristics of the received signal. In a switched antenna diversity system, only one antenna is utilized for reception at any instant in time and, thus, the non-selected antennas do not contribute to the demodulated signal. EGC and MRC systems generally outperform switched antenna diversity systems. However, EGC and MRC systems tend to be more expensive to implement, as they require multiple receiver analog front-ends.

Constant modulus algorithm (CMA) systems have been implemented extensively in digital broadcasting. In general, combining signals from multiple antennas advantageously provides antenna directionality, which allows interferers (i.e., multipath rays) to be suppressed by creating a null in the antenna pattern in the direction of the multipath interferer. In such systems, the method for determining the combining weights varies, depending upon the application. In the case of an FM receiver implemented in a mobile application, the combining of the signals is particularly challenging, as an implemented algorithm must adapt as the vehicle moves. In a usual case, adaptation is blind, i.e., there is no cooperation between the transmitter and receiver, and the received signal is an analog signal. As such, signal imperfections are difficult to mask.

However, FM modulated signals initially have a constant modulus (amplitude), which provides prior knowledge about the transmitted signal. Unfortunately, in a multipath reception environment, a received signal no longer possesses this constant modulus property, as a result of flat or frequency selective fading, and, as such, the complex baseband signal trajectory is no longer a circle but may take the form of a complicated spiro-graph. Fortunately, in systems that combine antenna signals, the signal amplitude information can be utilized to determine combining weights for the signals from the different antennas.

In general, for narrowband modulation, signal combining may be accomplished by adjusting the amplitudes and phases of the individual antenna signals, prior to summation, to optimize appropriate receiver metrics. The gain and phase applied to each antenna signal is equivalent to complex weighting in the complex baseband model and are referred to as antenna or combining weights. The weighted summation of the individual antenna signals results in an overall reception pattern. The combining method determines the weights which optimize certain receiver metrics. In practice, an iterative solution is generally used to solve for the optimal weights and the system is said to 'adapt'.

The MRC method attempts to maximize some measure of signal-to-noise ratio (SNR) (often called CNR). The CMA method attempts to minimize variation of the received signal amplitude. The CMA method is known to steer the antenna pattern so as to place nulls in the direction of the interfering signals (multipath reflections in this case). The combined antenna pattern varies with the frequency of the received signal so for an FM modulated signal the weights must be adapted rapidly such that the multipath reflection is nulled as it moves in frequency due to the modulation. Because the signal modulation is normally not present in the amplitude of an FM signal, the CMA adaptation bandwidth can extend into the modulation bandwidth such that the adaptation can be fast enough to maintain the necessary null direction as the frequency of the received signal changes due to the modulation.

In general, the CMA method performs well for FM multipath, especially in strong signal conditions where the received distortions are dominated by multipath interference, as opposed to noise. However, as the received signal becomes weak, the amplitude becomes corrupted by noise and the constant modulus assumption of the received signal begins to fail and the CMA performance correspondingly degrades. In addition, the CMA can 'lock' to spurs in the received signal that become unmasked as the desired signal becomes weak. In contrast, the MRC adaptation is influenced by the signal modulation and, thus, the adaptation bandwidth is limited. However, the MRC assumptions remain valid even for weak received signals. Therefore, while the CMA tends to outperform the MRC for strong signals, the CMA may have difficulty with weak signals and, in this case, the MRC tends to yield better and more consistent performance.

The CMA is a relatively efficient algorithm that allows for adaptation, based on amplitude variation of known constant amplitude signals. In a two antenna case with a single interferer, it is usually possible to position a null in the direction of the multipath interferer (i.e., in the long delay multipath). For an incident plane wave, only the phase of the received signals differ between the two antennas and, thus, combining weights can be found such that the signals cancel in the combined output. While this solution does, in fact, satisfy the constant modulus constraint, it does not guarantee that a system implementing a CMA will adapt to the solution and, in general, the solution may not be unique. For example, a null can be placed in the direction of the direct path and still satisfy the CMA constraint. While this may be acceptable, as noted above, the assumption of constant modulus degrades as the received signal becomes weak, as noise violates the constant modulus property. Furthermore, the wide adaptation bandwidth, which makes the CMA effective in long delay multipath, results in noisy adaptation for weak signals.

Referring to FIG. 1, a prior art dual tuner design wherein each tuner has one antenna with no diversity is shown. Dual tuner 10 includes antenna A1 and antenna A2 each respectively coupled to front-end tuner 12 and front-end tuner 14 both of which are coupled to digital signal processor (DSP) 11. Both tuners 12 and 14 are used to reduce multipath distortion and, in many applications, the diversity algorithm is halted and a secondary tuner, e.g., tuner 14, is used for background processing. Therefore, disadvantageously, there is no reduction in multipath distortion due to diversity by giving up the secondary tuner.

Referring to FIG. 2, an alternative prior art dual tuner design is shown. Dual tuner 20 includes antenna A1 coupled via power splitter 26 to front-end tuner 22 and front-end tuner 24 without diversity. One tuner is utilized to demodulate audio and the other tuner is used for background processing. Performance degradation of dual tuner 20 occurs due to power splitter 26 because splitter 26 must be used to supply both tuners 22 and 24 with the FM signal.

SUMMARY OF THE INVENTION

The present invention provides a receiver system with dual tuner diversity for background processing and for reducing multipath distortion. The receiver system provides a plurality of antennas with a dual tuner design. One tuner may be used solely for background processing of a received signal while the other tuner may be simultaneously used to reduce multipath distortion.

An advantage of the present invention is a reduction of multipath distortion by using a dual tuner design with a switched diversity algorithm.

Another advantage of the present invention is the ability to provide background processing while simultaneously reducing multipath distortion without affecting signal quality.

In one form thereof, the present invention provides a method for background processing and for reducing multipath distortion in an FM stereo receiving system having a first antenna coupled to a first tuner and a second antenna, including selectively coupling one of the first antenna and the second antenna to a second tuner; background processing an output from the first tuner to provide background processing of the FM signal; and reduction processing an output from the second tuner to provide reduction of multipath distortion.

In another form thereof, the present invention provides a mobile FM receiver, including a first antenna and a second antenna; and a processor coupled to an output of the first and second antennas, wherein the processor has software enabling the processor to execute an algorithm that causes the processor to perform the steps of processing a first antenna signal received by the first antenna to provide background processing; and processing either the first antenna signal received by the first antenna or a second antenna signal received by the second antenna to provide reduction of multipath distortion.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a prior art dual tuner design with two antennas;
FIG. 2 is a prior art dual tuner design with one antenna.

Figure 3:
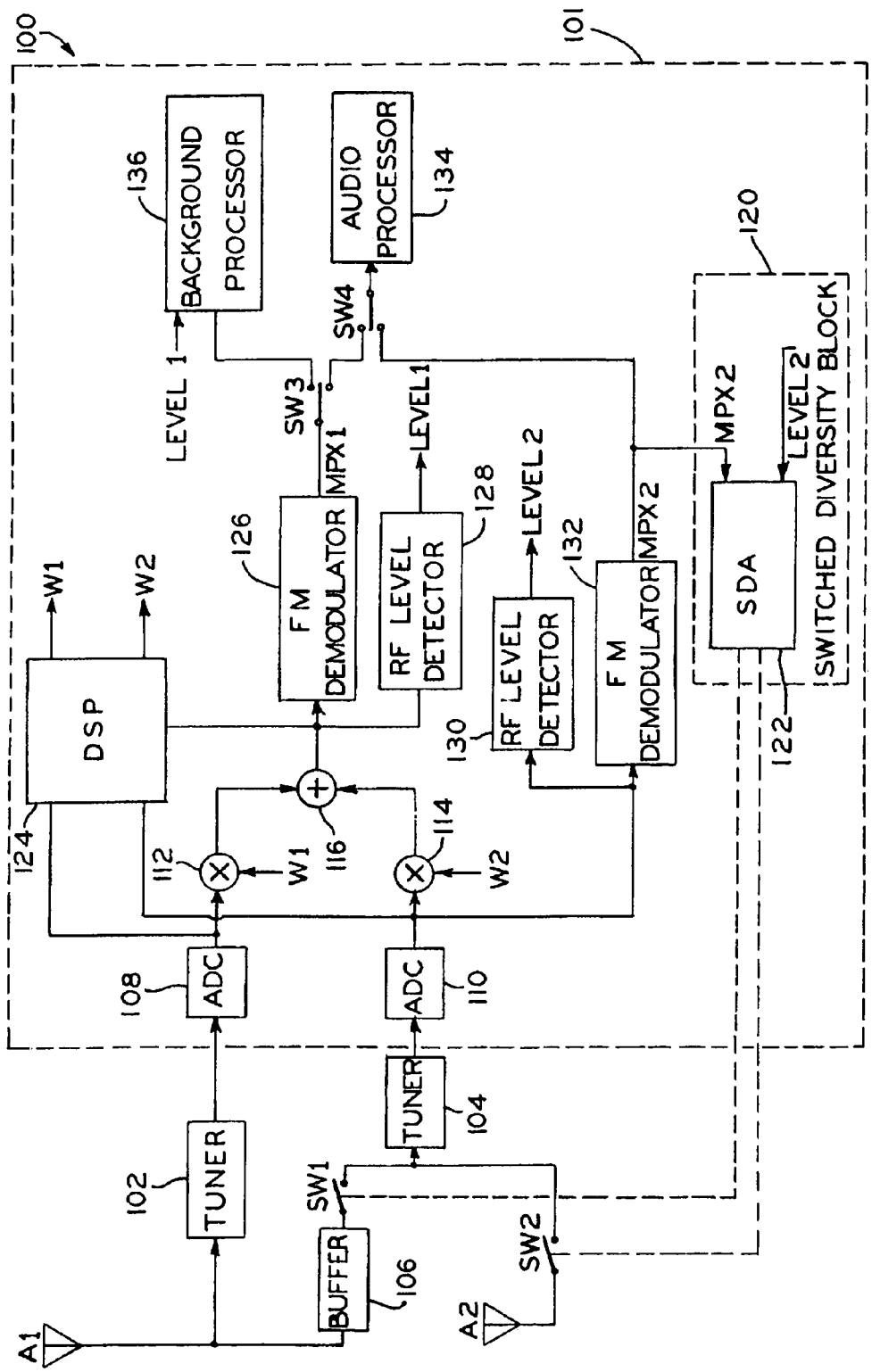
FIG. 3 is a dual tuner design in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplifications are not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Today, manufacturers of automotive radios have moved from analog receiver systems to receiver systems that have increasingly incorporated more digital components within the receiver systems. As a general rule, the functions that are performed by these digital components are being increasingly implemented in digital signal processing (DSP) software.

With reference to FIG. 3, an exemplary radio receiver system 100 is shown, which includes antennas A1 and A2 and DSP 101. Antenna A1 is coupled to front-end tuner 102. The output of tuner 102 is provided to an input of an analog-to-digital converter (ADC) 108, which converts the received analog signal to a digital signal. An output of ADC 108 is coupled to an input of a digital signal processor (DSP) 124, which digitally processes the digital signal to provide an audio signal. Antenna A1 is also coupled to front-end tuner 104 via buffer 106 and switch SW1. The output of tuner 104 is provided to an input of ADC 110, which converts the received analog signal to a digital signal. An output of ADC 110 is coupled to an input of DSP 124. Antenna A2 is coupled to tuner 104 via switch SW2.

DSP 124 calculates and provides two values W1 and W2 which represent either CMA/MRC weight or constants. In one mode of operation (Mode 1), DSP 124 is set to calculate and compute CMA/MRC weights W1 and W2 in accordance with the method described in a co-pending U.S. patent application entitled "Technique for Reducing Multipath Interference in an FM Receiver", (U.S. Patent Application Publication No. 2007/0037538), assigned to the assignee of the present application, the disclosure of which is hereby expressly incorporated herein by reference. The values for W1 and W2 are then multiplied with the outputs from ADC 108 and ADC 110 via multipliers 112 and 114, respectively. The outputs from multipliers 112 and 114 are summed via adder 116 and input into FM demodulator 126 and RF level detector 128. FM demodulator 126 provides an output signal MPX1 and RF level detector 128 provides an output signal Level 1. Output signal MPX1 in Mode 1 is used as an input to audio processor 134. Audio processor 134 provides an output for a user listening to system 100. In Mode 1, there is no background processing or switched diversity. Thus, output signal Level 1 is used as an input to background processor 136 only in Mode 2 described below.

The output from ADC 110 is also inputted into RF level detector 130 and FM demodulator 132. RF level detector 130 provides an output signal Level 2 and FM demodulator 132 provides an output signal MPX2. Output signals Level 2 and MPX2 are input into switched diversity algorithm (SDA) 122, the function of which will be described hereinbelow.

When DSP 124 is set to calculate W1 and W2 based on CMA/MRC weight, MPX1 is inputted into audio processor 134 via switch SW3 positioned in the lower position and switch SW4 positioned in the upper position. Additionally, switch SW1 is set open and switch SW2 is set closed.

In another mode of operation (Mode 2), when DSP 124 is set to dispose W1 and W2 as constant values, switch SW3 is connected to the upper position, such as to input output signal MPX1 into background processor 136, and SW4 is connected to the lower position, such as to input output signal MPX2 into audio processor 134. The values for W1 and W2 are set to constant values which correspond with W1 being equal to 1 and W2 being equal to 0. In this mode of operation, DSP 124 is only used to set W1 and W2 to constant values and antenna A1 and tuner 102 are used only for background processing via background processor 136. Background processing is appropriate for radio broadcasts containing program information embedded in the radio signal, for example European radio data systems (RDS) and traffic information applications such as Traffic Message Channel (TMC). For example, system 100 in Mode 2 scans the whole FM spectrum for available stations that have the same audio content that the user is listening to while travelling long distances. With background processing, the radio keeps a list of all available good, i.e., listenable, stations that the user is interested in and the corresponding program information. In this manner, the user can listen to particular audio content for an extended period of time without knowing the tuned frequency. The radio finds the frequency automatically based on output signals Level 1 and MPX1. The output from background processor 136, i.e., available stations and program information, is saved in memory. When W1 is set to 1 and W2 is set to 0, adder 116 simply adds the output from multiplier 112 to 0 because the output from multiplier 114 is zero due to the constant value 0 of W2.

Switch SW1 and switch SW2 are either closed or open depending on the output from switched diversity block 120 which has SDA 122 therein. In general, switched diversity block 120 improves FM reception by reducing multipath distortion by choosing a least distorted antenna signal from one of a plurality of antennas, e.g., A1 and A2. As noted above, switched antenna diversity is generally the simplest algorithm to implement among antenna diversity systems. In essence, the switched antenna diversity system selects the antenna with the best signal-to-noise ratio (SNR) with tuner 104. The best SNR indicates which antenna provides the least distorted antenna signal, and, consequently, SDA 122 provides an output to close either switch SW1 or switch SW2, depending on the chosen antenna. Thus, either antenna A1 or antenna A2 is used in conjunction with tuner 104 for audio processing, i.e., for reduction of multipath distortion. Thus, Mode 2 provides switched diversity and background processing simultaneously.

Switched diversity block 120 and its mode of operation on how to select the least distorted antenna signal are fully described in a method and apparatus in a copending U.S. patent application entitled "Technique for Reducing Multipath Distortion in an FM Receiver", (U.S. Patent Application Publication No. 2007/0036249), assigned to the assignee of the present application, the disclosure of which is hereby expressly incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for background processing and for reducing multipath distortion simultaneously in an FM stereo receiving system having a first antenna coupled to a first tuner and a second antenna, comprising:
    selectively coupling one of the first antenna and the second antenna to a second tuner through a plurality of switches such that the first antenna is coupled through a data buffer for isolating the first tuner;
    background processing an output from the first tuner to provide background processing of the FM signal;
    reduction processing an output from the second tuner to provide reduction of multipath distortion; and
    dynamically selecting between a weighted mode and a background processing and switched diversity mode of operation based upon optimal receiving conditions.

2. The method of claim 1, wherein said background processing step comprises using a background processor to process the output from the first tuner.

3. The method of claim 2, wherein said background processing step further comprises demodulating the output from the first tuner and providing the demodulated signal to the background processor.

4. The method of claim 1, wherein said reduction processing step comprises using an audio processor to process the output from the second tuner.

5. The method of claim 4, wherein said reduction processing step further comprises demodulating the output from the second tuner and providing the demodulated signal to the audio processor.

6. The method of claim 1, wherein said selectively coupling is based on which antenna provides a least distorted and stronger signal.

7. The method of claim 6, wherein said selectively coupling step comprises selecting either the first antenna or the second antenna based on a switched diversity algorithm.

8. The method of claim 1, wherein said weighted mode comprises calculating and computing a constant modulus algorithm (CMA)/maximal ratio combiner (MRC) weight.

9. A mobile FM receiver, comprising:
    a first antenna and a second antenna; and
    a processor coupled to an output of said first and second antennas, wherein said processor has software enabling said processor to execute an algorithm that causes said processor to perform the steps of:

processing a first antenna signal received by said first antenna using a first tuner to provide background processing; and processing either said first antenna signal received by said first antenna or a second antenna signal received by said second antenna using a second tuner and a plurality of switches to provide reduction of multipath distortion such that the first antenna signal is coupled to the second tuner using a data buffer for isolating the first tuner where the first antenna signal and second antenna signal may be mathematically added in order to reduce multipath distortion using at least one diversity algorithm.

10. The FM receiver of claim 9, wherein said processor has software enabling said processor to select either said first antenna signal or said second antenna signal to provide reduction of multipath distortion based on which antenna signal is least distorted and stronger.

11. The FM receiver of claim 10, wherein said processor has software enabling said processor to select either said first antenna signal or said second antenna signal based on a switched diversity algorithm.

12. The FM receiver of claim 9, further comprising a background processor and an audio processor each coupled to at least one of said first antenna and said second antenna.

13. The FM receiver of claim 12, wherein said background processor is coupled to said first antenna.

14. The FM receiver of claim 13, further comprising an analog-to-digital converter and multiplier coupled to the first tuner for controlling a digital signal provided to an adder.

15. The FM receiver of claim 14, further comprising an FM demodulator coupled to said first tuner, said FM demodulator coupled to said background processor.

16. The FM receiver of claim 14, further comprising a digital signal processor coupled to said first tuner.

17. The FM receiver of claim 12, wherein said audio processor is selectively coupled to one of said first antenna or said second antenna.

18. The FM receiver of claim 17, further comprising an analog-to-digital converter and multiplier coupled to the second tuner for controlling a digital signal provided to an adder.

19. The FM receiver of claim 18, further comprising an FM demodulator coupled to said second tuner, said FM demodulator coupled to said audio processor.

20. The FM receiver of claim 18, wherein said second antenna or said first antenna is connected to said second tuner based on which antenna has a least distorted and stronger signal.

21. The FM receiver of claim 18, further comprising a digital signal processor coupled to said second tuner.

22. The FM receiver of claim 9, wherein said processor calculates and computes a constant modulus algorithm (CMA)/maximal ratio combiner (MRC) weight.

* * * * *